United States Patent [19]

Galli et al.

[11] 3,952,601
[45] Apr. 27, 1976

[54] HELICOPTER ROTOR BLADE BALANCING METHOD

[75] Inventors: Charles V. Galli, Trumbull; Robert Zincone, Norwalk, both of Conn.

[73] Assignee: United Technologies Corporation, Hartford, Conn.

[22] Filed: Dec. 18, 1974

[21] Appl. No.: 533,916

[52] U.S. Cl. .................. 73/455; 416/23; 416/144; 416/500
[51] Int. Cl.² ................ G01M 1/22
[58] Field of Search ....... 416/62, 23, 144, 229, 416/241 B, 500, 1, 61; 244/42 DA; 73/455

[56] References Cited
UNITED STATES PATENTS

| 331,369 | 12/1885 | Bliss et al. | 416/62 |
|---|---|---|---|
| 1,990,291 | 2/1935 | Larsen | 416/1 |
| 2,135,700 | 11/1938 | Cierva | 416/23 |
| 2,430,948 | 11/1947 | Platt | 416/144 |
| 2,951,542 | 9/1960 | Stulen et al. | 416/144 |
| 2,961,053 | 11/1960 | Prewitt et al. | 416/229 X |
| 3,018,832 | 1/1962 | Prewitt | 416/144 |
| 3,237,697 | 3/1966 | Ford et al. | 416/226 |
| 3,524,354 | 8/1970 | Frank et al. | 73/455 |
| 3,586,267 | 6/1971 | Sundberg | 244/42 DA |
| 3,830,109 | 8/1974 | Litvinovich et al. | 73/455 |

FOREIGN PATENTS OR APPLICATIONS

| 1,556,422 | 2/1969 | France | 416/144 |
|---|---|---|---|
| 496,700 | 12/1938 | United Kingdom | 416/62 |

*Primary Examiner*—Everette A. Powell, Jr.
*Attorney, Agent, or Firm*—Vernon F. Hauschild

[57] ABSTRACT

A helicopter rotor blade having at least one ramp tab of selected span and chord dimensions, weight and shaped to define an outer surface of selected angularity with respect to the blade chord and being selectively positioned along the blade trailing edge and bonded to its upper or lower surface so as to be totally within the blade chord profile and be effective to eliminate or reduce to within acceptable limits blade pitching moment dynamic unbalance.

3 Claims, 3 Drawing Figures

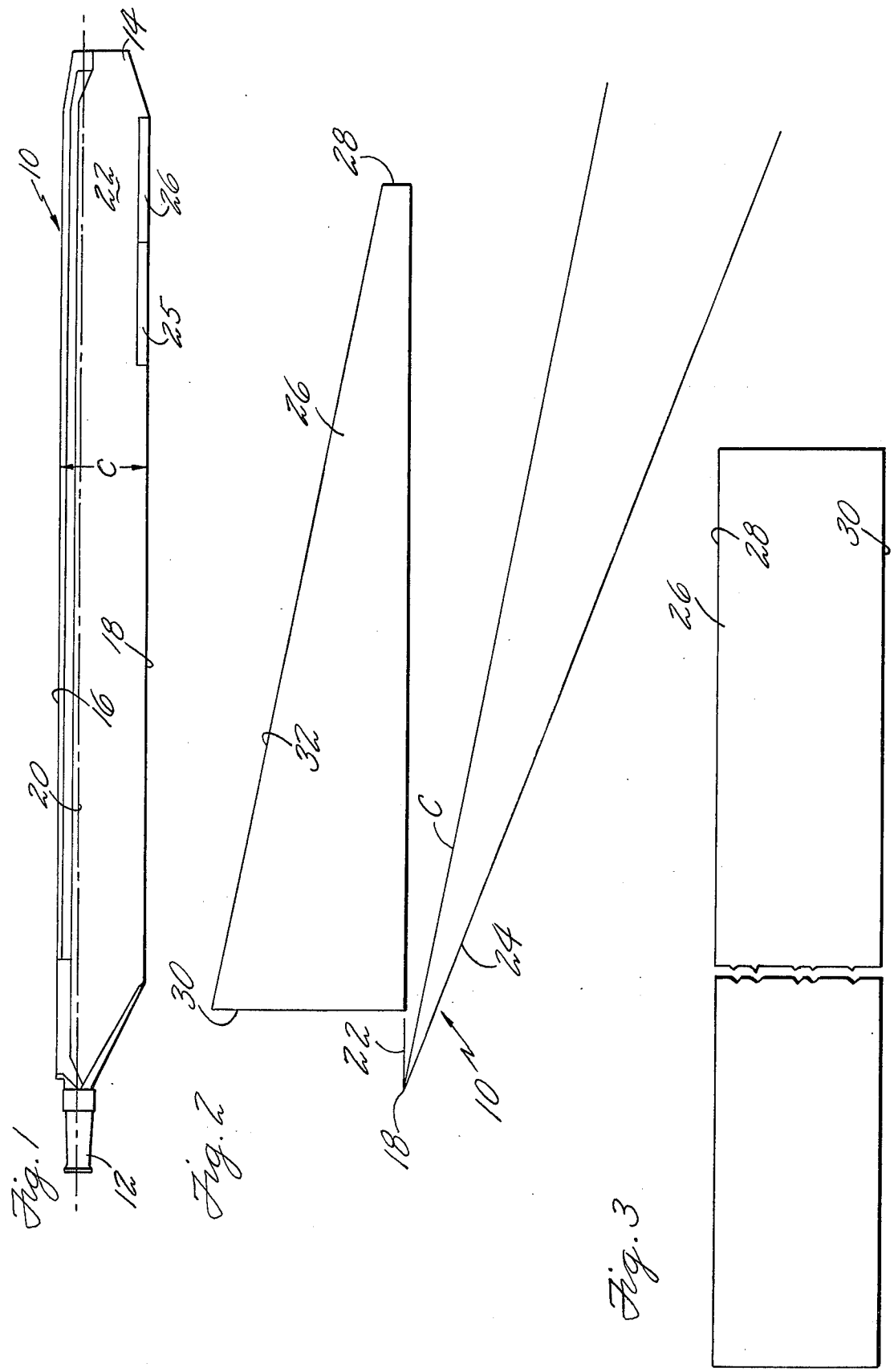

HELICOPTER ROTOR BLADE BALANCING METHOD

BACKGROUND OF THE INVENTION

1. Field of the Invention

This invention relates to helicopter rotor blades and more particularly to selectively shaped ramp tabs for use therewith to eliminate or reduce to within acceptable limits blade pitching moment dynamic unbalance and being bonded thereto so as to be totally within the blade chord dimension to avoid trailing edge damage.

2. Description of the Prior Art

In the fixed wing and rotary wing art, trailing edge trim tabs have been used to reduce rotor unbalance, however, all known types of trim tabs are either bolted or riveted to the blade as in Howard U.S. Pat. No. 2,656,132, and such a connection subjects the blade proper to risk of fatigue failure. Trim tabs have also been installed so as to extend rearwardly beyond the trailing edge of the blade, such as in Stulen et al. U.S. Pat. No. 2,951,542 or British Pat. No 1,150,123 to Young dated Apr. 30, 1969, or metallic trailing edge pockets of blades are selectively bent to shape at their trailing edges for balance purposes. Experience has shown that blade trailing edges so deformeed and trim tabs extending beyond the blade trailing edge are highly susceptible to damage during blade handling thereby throwing the blade out of balance. Pivotable aileron-type tabs have been used in helicopter blades, such as the Verhage et al. U.S. Pat. No. 2,757,745 and Stevens U.S. Pat. No. 2,994,384, however, these devices add the complication of requiring actuating mechanism with its attendant weight and mechanical failure possibilities. The trim tab in Prewitt et al. U.S. Pat. No. 2,961,053 is apparently also of the aileron type.

SUMMARY OF THE INVENTION

A primary object of the present invention is to provide an improved helicopter rotor blade, for use with main rotor or tail rotor, with a selectively shaped ramp tab to eliminate blade pitching moment dynamic unbalance, and which may be attached to the blade so as not to endanger the structural integrity of the blade proper, without deforming the blade in any way, and totally within the chord profile of the blade so as to be free from blade trailing edge damage during blade handling.

In accordance with the present invention, one or more ramp-shaped tabs of selected weight, span dimension, chord dimension and ramp angularity are bonded to the blade upper or lower surface along the blade trailing edge at selected span stations and so as to be totally within and not project beyond the blade chord profile so as to eliminate blade pitching moment dynamic unbalance.

The present invention permits blade handling without damage to the ramp tab.

It is also a feature of this invention that the tab is of ramp shape so as to be of selected height at its leading edge and a considerably greater selected height at its trailing edge so that, when bonded to the blade upper or lower airfoil surface, the exterior ramp surface will define a select angle with respect to blade chord.

In accordance with a further aspect of the present invention, the ramp tab is made of a lightweight material such as rubber, balsa wood, foam or plastic or other simple materials, and is preferably uniform in weight along its length or span dimension so that fine pitching moment alterations may be made by altering the tab length.

Other objects and advantages of the present invention may be seen by referring to the following description and claims, read in conjunction with the accompanying drawings.

BRIEF DESCRIPTION OF THE DRAWINGS

FIG. 1 is a showing of a helicopter blade utilizing the ramp tabs taught herein.

FIG. 2 is a cross-sectional showing of a preferred embodiment of the ramp tab.

FIG. 3 is a top view of the preferred embodiment of the ramp tab taught herein.

DESCRIPTION OF THE PREFERRED EMBODIMENT

Referring to FIG. 1 we see helicopter rotor blade 10, which may be either a main rotor blade or a tail rotor blade, and which consists of root end 12, tip end 14, leading edge 16, trailing edge 18, feathering or pitching moment axis 20, top aerodynamic surface 22, and bottom aerodynamic surface 24 (see FIG. 2). In conventional fashion, the blade span extends between root 12 and tip 14, while the blade chord C extends between leading edge 16 and trailing edge 18. In conventional fashion, blade 10 is connected through its root section 12 to a helicopter rotor head, together with one or more other blades, and caused to rotate so as to generate lift or otherwise control the flight of a rotary wing aircraft.

Blade 10, may be an all metal blade or a composite blade made of parts of different material, for example, it may have a metallic structural spar and plastic impregnated fiber glass skin attached thereto and supported therefrom.

During helicopter operation, it is important that the pitching moments of blade 10 about feathering axis 20 are eliminated or minimal since pitching moment dynamic unbalance in a blade could cause undesired pitch change, impose unnecessary loads upon the pitch change mechanism, cause aircraft vibration, or put the rotor into unbalance which adversely effects the handling qualities of the aircraft.

To eliminate rotor blade pitching moment dynamic unbalance in blade 10, one or more ramp tabs 25 and 26 are bonded along the blade trailing edge to either the blade upper surface 22 or the blade lower surface 24 at selected span stations so as to eliminate or reduce to within acceptable limits blade pitching moment dynamic unbalance. As used herein, the term "blade pitching moment dynamic unbalance" means the pitching moment unbalance developed or generated when the helicopter blade 10 is rotated or whirled in the fashion that it will rotate when forming part of a helicopter rotor.

It is an important teaching of this invention that ramp tabs 25 and 26 are bonded to blade 10 so as to be totally within the blade chord profile C and not extend therebeyond to thereby avoid susceptibility to damage, which frequently occurs along the blade trailing edge during blade handling.

A ramp tab 26 is shown in greater particularity in FIGS. 2 and 3 and includes leading edge 28, whose height is substantially less than the height of trailing edge 30 so that the ramp external surface 32 defines the selected angle with respect to chord C when the ramp tab 26 is bonded to either blade upper surface 22 or blade lower surface 24. Ramp tab 26 is preferably made of an elastomer, such as PR1535 and is bonded to blade 10 as described with Hysol EA9309.2 adhesive, but it should be borne in mind that it could be made of any lightweight substance such as balsa wood, foam or plastic. In the preferred molded elastomer form, two different shaped ramp tabs seem adequate for most helicopter blade applications one wherein the leading edge is approximately 0.010 inch high and the trailing edge is between 0.030 and 0.050 high, and a second embodiment in which the blade leading edge is the same limension but the blade trailing edge is approximately 0.060 to 0.080 inch high. In both embodiments, the ramp chord dimension or depth is about 0.60 inch, while its span dimension or length is about 60 inches. This selection of ramp angularity, the selection of blade span position at which the ramp tab is bonded to the blade, and the tab weight eliminates most of the pitching moment dynamic unbalance, and fine pitching moment unbalance correction may be made by variation in tab length by a simple tab cutting operation since the tab is of uniform weight along its length or span position. This permits the sizing and positioning of the ramp tab or tabs to either eliminate or reduce to within acceptable limits, the rotor blade pitching moment dynamic unbalance.

In practice, rotor blade 10 is whirled on a whirl rig with other blades, at least one of which is the master or completely balanced blade. The blades so mounted are whirled, and the load required to retain the blade under test in constant pitch position is determined and compared to the load required to hold the master blade in fixed pitch. In this fashion, the amount of unacceptable blade pitching moment dynamic unbalance is determined from the blade under test and one or more ramp tabs 25 and 26 are selected for their angularity, and weight, and are temporarily fastened along the blade trailing edge at selected span positions by tape or other convenient temporary connecting mechanism, whereupon the blade is whirled again carrying the temporary ramp tabs and its pitching moment dynamic unbalance again determined. If the unbalance is still out of limit, ramp tabs may be added or removed as required and, when finer adjustment is required, the length of any ramp tab can be varied by a simple cutting operation. This procedure is followed with the ramp tabs so tailored and temporarily connected to the blade so that all ramp tabs, and portions thereof, are fully within the blade chord profile and do not extend therebeyond, and the blade is again whirl tested and the ramp tabs tailored until acceptable blade pitching moment dynamic unbalance is achieved. The ramp tabs or tab is then permanently bonded in the position of the final test and, preferably the blade is once again whirl tested to verify proper pitching moment dynamic balance.

It is to be understood that the invention is not limited to the specific embodiment herein illustrated and described but may be used in other ways without departure from its spirit as defined by the following claims.

We claim:

1. The method of eliminating pitching moment dynamic unbalance in a helicopter rotor blade comprising the steps of:
  A. whirling the blade in rotor motion fashion to determine its degree of pitching moment dynamic unbalance,
  B. temporarily attaching at least one ramp-shaped tab of selected weight, span dimension, chord dimension and external surface angularity with respect to the blade chord at a selected station along the blade span and at the blade trailing edge upper or lower surface so as to be positioned totally within the blade chord profile and not extend therebeyond,
  C. whirling the blade with the ramp tab or tabs so temporarily attached to determine blade pitching moment dynamic unbalance,
  D. adjusting the span dimension, span location or number of ramp tabs and rewhirling the blade until all pitching moment dynamic unbalance is eliminated or reduced to acceptable limits, and
  E. permanently bonding the tab or tabs so selected in the final tested position.

2. The method according to claim 1 and the additional step of again whirling the blade with the tab or tabs so permanently bonded to determine whether blade pitching moment dynamic unbalance is within acceptable limits.

3. The method according to claim 1 wherein fine adjustments in blade pitching moment dynamic unbalance reduction or elimination is accomplished by altering the span dimension of the ramp tab.

* * * * *